United States Patent
Baughman et al.

(10) Patent No.: US 11,188,592 B2
(45) Date of Patent: Nov. 30, 2021

(54) QUANTUM SUPERPOSITION AND ENTANGLEMENT OF SOCIAL SENTIMENT AND NATURAL LANGUAGE GENERATION

(71) Applicant: International Business Machines Corporation, Armonk, NY (US)

(72) Inventors: Aaron K. Baughman, Silver Springs, MD (US); Mauro Marzorati, Lutz, FL (US); Gary Diamanti, Wake Forest, NC (US); Diwesh Pandey, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 15/888,314

(22) Filed: Feb. 5, 2018

(65) Prior Publication Data
US 2019/0243925 A1    Aug. 8, 2019

(51) Int. Cl.
*G06F 16/00* (2019.01)
*G06F 16/9032* (2019.01)
*G06F 16/33* (2019.01)
*G06N 10/00* (2019.01)

(52) U.S. Cl.
CPC .... *G06F 16/90332* (2019.01); *G06F 16/3334* (2019.01); *G06N 10/00* (2019.01)

(58) Field of Classification Search
CPC .......................... G06F 16/3334; G06F 16/3331
USPC .................................................. 707/771, 708
See application file for complete search history.

(56) References Cited

U.S. PATENT DOCUMENTS

| | | | |
|---|---|---|---|
| 5,768,297 A | 6/1998 | Shor | |
| 10,037,491 B1* | 7/2018 | Fang | ........................ G06F 40/30 |
| 10,984,034 B1* | 4/2021 | Sandland | ............... G06N 20/20 |
| 2009/0138356 A1 | 5/2009 | Pomplun | |
| 2013/0018875 A1* | 1/2013 | Qiao | ................... G06F 16/3331 707/723 |
| 2013/0173254 A1 | 7/2013 | Alemi | |
| 2014/0136188 A1 | 5/2014 | Wroczynski et al. | |
| 2014/0171133 A1 | 6/2014 | Stuttle et al. | |
| 2015/0227528 A1* | 8/2015 | Kang | ...................... G06F 40/20 707/750 |

(Continued)

FOREIGN PATENT DOCUMENTS

| | | |
|---|---|---|
| CN | 101075808 A | 11/2007 |
| CN | 103294108 A | 9/2013 |

OTHER PUBLICATIONS

Patent Cooperation Treaty, Notification of Transmittal of the International Search Report and Written Opinion, dated Mar. 1, 2019, regarding Application No. PCT/EP2019/051021, 13 pages.

*Primary Examiner* — Thu Nguyet T Le
(74) *Attorney, Agent, or Firm* — Yee & Associates, P.C.

(57) ABSTRACT

Generating a natural language text response to a user query is provided. Sentiment attributes of the user query are encoded into qubits as particle spins. The particle spins in encoded sentiment qubits are observed to generate spin data. A sentiment value is derived for each sentiment key term of the user query based on the generated spin data. A total sentiment of the user query is determined by combining derived sentiment values corresponding to each sentiment key term of the user query. A natural language text response to the user query is generated based on the determined total sentiment of the user query. The natural language text response is transmitted to a client device via a network.

21 Claims, 7 Drawing Sheets

(56) References Cited

U.S. PATENT DOCUMENTS

2017/0351676 A1 12/2017 Allen et al.
2018/0039903 A1* 2/2018 Mosca .................. G06N 10/00

* cited by examiner

QUANTUM SUPERPOSITION AND ENTANGLEMENT OF SOCIAL SENTIMENT AND NATURAL LANGUAGE GENERATION

BACKGROUND

1. Field

The disclosure relates generally to natural language processing and more specifically to quantum computing in natural language processing of social sentiment to generate encoded sentiment qubits corresponding to sentiment key terms extracted from an ingested natural language passage of text and then generate a natural language response in a tone appropriate for the sentiment expressed in the ingested natural language passage of text based on the encoded sentiment qubits.

2. Description of the Related Art

Natural language processing is an ability of a computer to understand human language and is a component of artificial intelligence. Natural language processing may, for example, parse text into identifiable parts, such as words, phrases, numbers, and punctuation marks. Natural language processing may perform various methods and techniques for analyzing text, such as, for example, syntactic analysis, semantic analysis, lexical analysis, and the like. Further, natural language processing may be configured to recognize and analyze any number of different languages.

Furthermore, natural language processing may assign a part of speech to each word. Natural language processing may determine the part of speech to which a word corresponds based on a definition of the word and a context of the word. The context of a word may be based on its relationship with adjacent and related words in a phrase, sentence, or paragraph. The context of a word also may be dependent on one or more previously analyzed passages of text. Examples of parts of speech that may be assigned to words include, but are not limited to, nouns, verbs, adjectives, adverbs, and the like.

Natural language processing may analyze a passage of natural language text to, for example, determine a customer's issue with a particular product. In addition, natural language processing may include sentiment analysis to identify sentiment expressed, such as anger, frustration, sarcasm, and the like, within the passage of text. Sentiment analysis may identify and categorize sentiment associated with keywords of interest.

A quantum computer is a hardware device that performs quantum computing, which utilizes quantum-mechanical phenomena, such as, superposition and entanglement. Quantum superposition states that any two or more quantum states can be added together (i.e., superposed) and the result will be another valid quantum state. In other words, quantum superposition states that the net response at a given place and time caused by two or more stimuli is the sum of responses that would have been caused by each stimulus. Quantum entanglement occurs when two or more particles interact in a way such that the quantum state of each particle cannot be described independently of the others, even when the particles are separated by a distance. In other words, quantum entanglement occurs when independent particles are separated by a distance, but are correlated together. Thus, an entangled state must be described for a system as a whole.

A classical computer has a memory made up of bits, where each bit is represented by either a one or a zero. A quantum computer maintains a sequence of quantum bits or qubits, which are the basic units of quantum computing. A single qubit can represent a one, a zero, or any quantum superposition of those two qubit states. For example, two qubits can be in any quantum superposition of 4 states (i.e., contain 4 bits of information) and three qubits in any superposition of 8 states (i.e., contain 8 bits of information). In general, a quantum computer with "n" number of qubits can be in an arbitrary superposition of up to $2^n$ different states simultaneously. This compares with a classical computer that can only be in one of two states at any one time.

An example of an implementation of qubits may be to use particles with two spin states. One spin state being a spin down state, which represents a zero state. The other spin state being a spin up state, which represents a one state. To represent superpositions, a coefficient, such as an "a" or "b" is placed in front of a quantum state.

A problem with social sentiment identification and natural language generation is that both processes are computationally intensive, but both processes also require real-time or near real-time solutions. Traditional social sentiment identification on a classical computer takes at least $O(n^2)$ operations. The first operation $O(n)$ determines sentiment for a word while the second operation $O(n)$ is an average sentiment expressed over a rolling window of time. Traditional natural language generation on a classical computer is generally probabilistic that follows slot fillers. However, no real-time solutions currently exist that takes into account the problems associated with traditional social sentiment identification and natural language generation on a classical computer.

SUMMARY

According to one illustrative embodiment, a computer-implemented method for generating a natural language text response to a user query is provided. A computer encodes sentiment attributes of the user query into qubits as particle spins. The computer observes the particle spins in encoded sentiment qubits to generate spin data. The computer derives a sentiment value for each sentiment key term of the user query based on the generated spin data. The computer determines a total sentiment of the user query by combining derived sentiment values corresponding to each sentiment key term of the user query. The computer generates a natural language text response to the user query based on the determined total sentiment of the user query. The computer transmits the natural language text response to a client device via a network. According to other illustrative embodiments, a computer system and computer program product for generating a natural language text response to a user query are provided.

According to another illustrative embodiment, a computer-implemented method for generating a natural language passage of text that expresses a sentiment opposite of that of an original natural language passage of text is provided. A computer analyzes an original passage of natural language text using natural language processing. The computer identifies a first set of key terms included in the original passage of natural language text having a first combined sentiment reflective of a sentiment expressed in the original passage of natural language text based on the analyzing. The computer, based on quantum superposition, encodes the first set of key terms having the first combined sentiment reflective of the sentiment expressed in the original passage of natural language text into a plurality of social sentiment qubits to form a plurality of encoded social sentiment qubits. The computer, from the plurality of encoded social sentiment qubits, based on quantum entanglement, generates a second set of key terms having a second combined sentiment that is opposite to the first combined sentiment such that the second combined sentiment opposes the sentiment expressed in the original passage of natural language text. The computer, using the second set of key terms, generates a different passage of natural language text expressing an opposite sentiment of that of the original passage of natural language text. According to another illustrative embodiment, a computer program product for generating a natural language passage of text that expresses a sentiment opposite of that of an original natural language passage of text is provided.

Thus, illustrative embodiments utilizing quantum superposition and quantum entanglement are able to reduce the number of computations required for social sentiment identification and natural language generation. Therefore, illustrative embodiments increase the performance of the computer, itself, by decreasing computer resource utilization. Quantum superposition enables illustrative embodiments to identify social sentiment in natural language text within one operation. Quantum entanglement provides illustrative embodiments an ability to generate natural language text based on words that produce a social sentiment that is entangled with a sentiment expressed in an original natural language passage of text.

In addition, illustrative embodiments utilize the qubits to encode sentiment data into a $2^n$ space rather than a binary n space allowing illustrative embodiments to encode and process for more sentiment data in parallel. The encoded social sentiment qubits can be in a position of spin up, spin down, or a combination of spin up and spin down at the same time. As a result, social sentiment identification and natural language generation by illustrative embodiments is in a real-time or near real-time scale. Moreover, illustrative embodiments are capable of automatically generating natural language words that will produce a congruent social sentiment or a contrasting social sentiment as that of a sentiment expressed in an original natural language passage of text.

Further, illustrative embodiments perform a checksum on derived sentiment values corresponding to each sentiment key term of a user query. By performing a checksum on derived sentiment values, illustrative embodiments are able to determine whether the illustrative embodiments generated the correct sentiment for a response to an analyzed original natural language passage of text.

DETAILED DESCRIPTION

Figure 1:
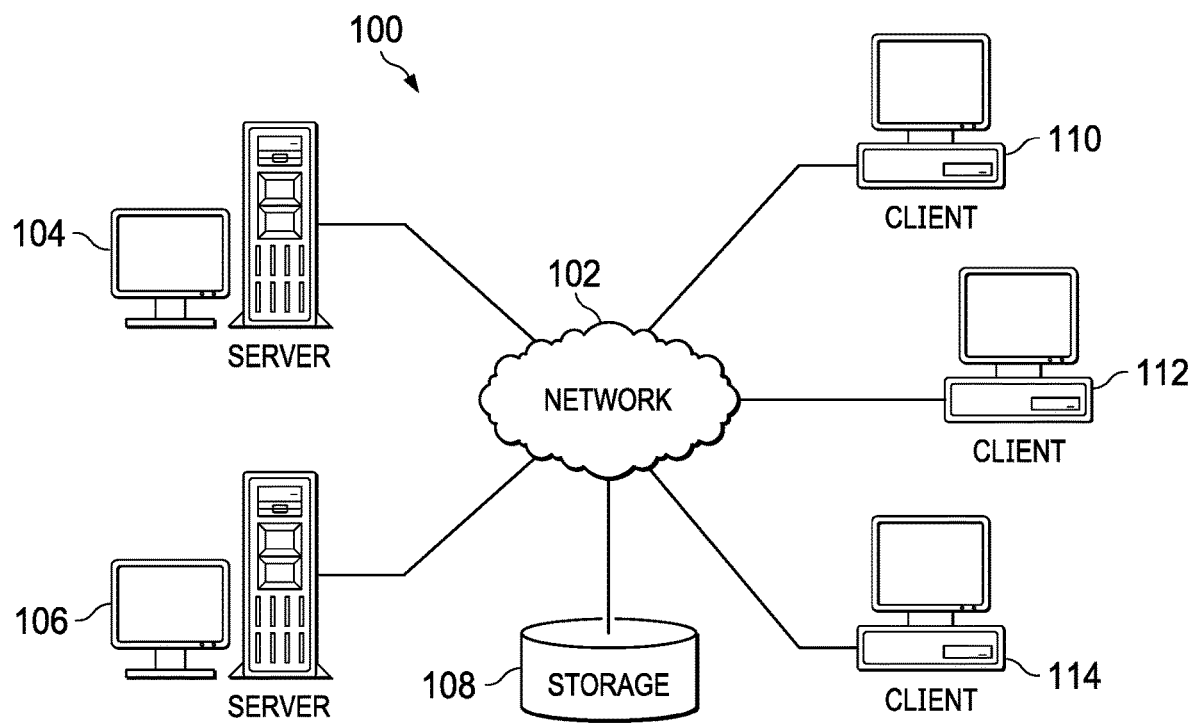
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
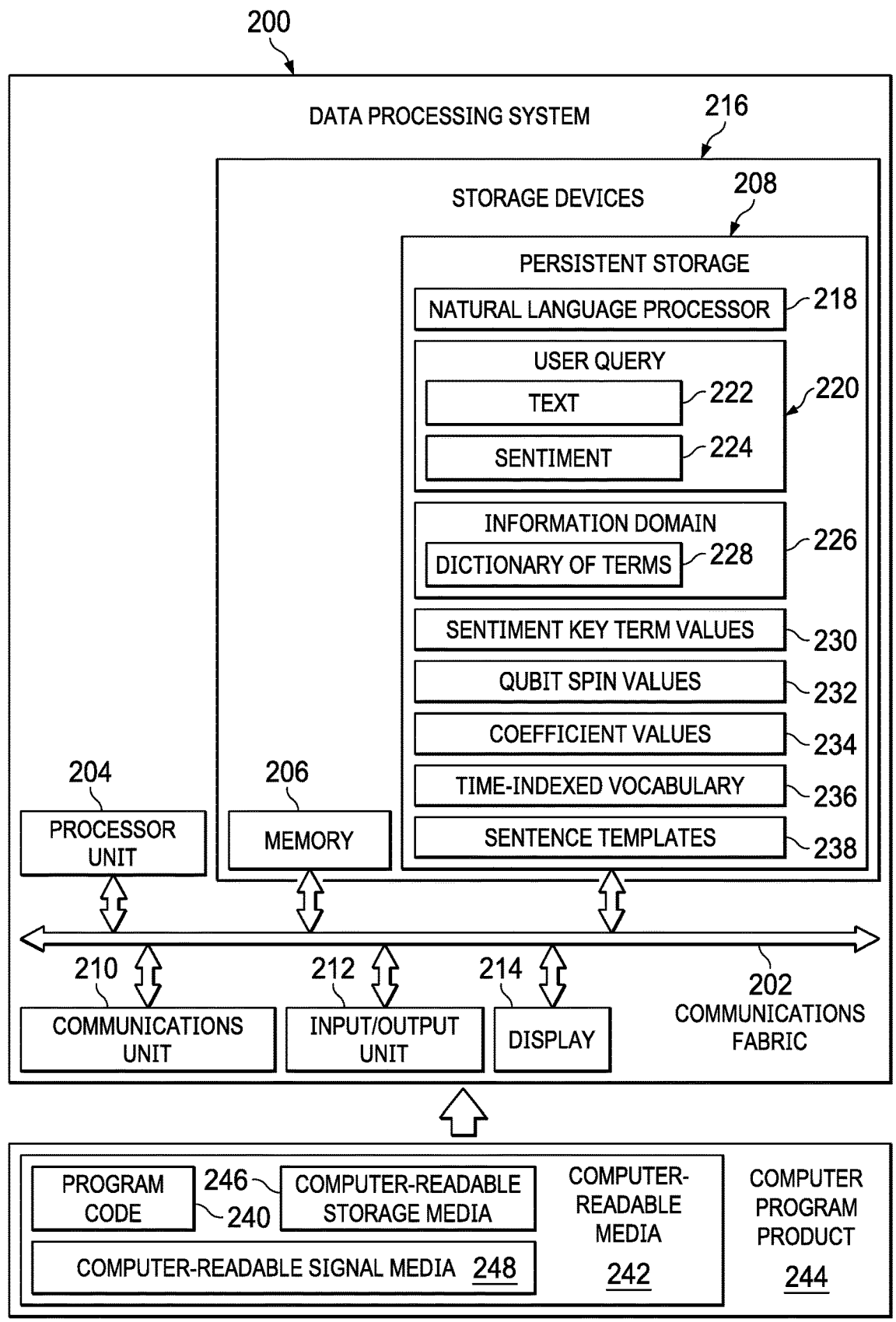
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, quantum computers with high-speed connections to network 102. In addition, server 104 and server 106 may provide a set of services for identifying social sentiment within textual passages, such as, for example, user queries, articles, books, problem tickets, and the like, and generating a natural language text response that conveys or expresses a sentiment appropriate to the identified social sentiment in the original textual passage. For example, server 104 may identify anger as the social sentiment expressed by a customer regarding a product in a user query received from a client device. In this case, server 104 generates a natural language text response to the user query that expresses an appropriate conciliatory sentiment to appease or pacify the angry customer. Also, it should be noted that server 104 and server 106 may represent a cluster of quantum computers hosting a plurality of different social sentiment identification and natural language generation services. Alternatively, server 104 and server 106 may represent quantum computers in a cloud environment that provides social sentiment identification and natural language generation services.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart televisions, smart watches, gaming devices, and the like, with wire or wireless communication links to network 102. Users of clients 110, 112, and 114 may utilize clients 110, 112, and 114 to access the social sentiment identification and natural language generation services provided by server 104 and server 106.

Storage 108 is a network storage device capable of storing any type of data in a structured format or an unstructured format. In addition, storage 108 may represent a plurality of network storage devices. Further, storage 108 may store identifiers for a plurality of client devices; information corresponding to a plurality of different information domains; time-indexed vocabularies; sentence templates; and the like. Furthermore, storage unit 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a quantum computer, such as sever 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores natural language processor 218. However, it should be noted that even though natural language processor 218 is illustrated as residing in persistent storage 208, in an alternative illustrative embodiment natural language processor 218 may be a separate component of data processing system 200. For example, natural language processor 218 may be a hardware component coupled to communication fabric 202 or a combination of hardware and software components. In another alternative illustrative embodiment, a first set of components of natural language processor 218 may be located on data processing system 200, while a second set of components of natural language processor 218 may be located on a second data processing system, such as server 106 or client 110 in FIG. 1. In yet another alternative illustrative embodiment, natural language processor 218 may be located on client devices in addition to or instead of data processing system 200.

Natural language processor 218 controls the process of analyzing ingested natural language passages of text, identifying social sentiment expressed in the ingested natural language passages of text, and generating natural language text responses, which express an appropriate (e.g., same or opposite) sentiment to that of the identified social sentiment expressed in the ingested natural language passages of text, by utilizing the quantum properties of superposition and entanglement. In this example, natural language processor 218 ingests user query 220, which may represent any type of textual passage, such as, for example, an email, a text message, problem ticket, and the like. User query 220 may be, for example, a request for information. User query 220 includes text 222 and sentiment 224. Text 222 may be in any natural language format, in any language, and refer to any information domain or subject. Sentiment 224 represents a set of key terms or keywords that express a sentiment, such as love, happy, sad, mad, angry, hate, satisfied, dissatisfied, ambivalent, and the like, which is conveyed in text 222 of user query 220.

Information domain 226 is a set of data corresponding to a particular domain of information, such as a financial domain, a business domain, a tax domain, an education domain, a government domain, and the like. However, it should be noted that information domain 226 may represent a plurality of different information domains. In this example, information domain 226 includes dictionary of terms 228. Dictionary of terms 228 contains a set of key terms or keywords associated with information domain 226.

Natural language processor 218 may utilize dictionary of terms 228 in information domain 226 to identify the topic or subject matter of user query 220. In addition, natural language processor 218 extracts the set of sentiment key terms from sentiment 224. Natural language processor 218 associates the set of extracted sentiment key terms with sentiment key term values 230. Sentiment key term values 230 represent a plurality of predefined values that correspond to a plurality of predefined sentiment key terms. In other words, each sentiment key term value in sentiment key term values 230 corresponds to a particular sentiment key term.

Natural language processor 218 encodes the set of sentiment key terms extracted from user query 220 into a set of qubits. The set of sentiment key terms may be encoded into the set of qubits as particle spins (e.g., spin ups, spin downs, or a combination of spin ups and spin downs). Natural language processor 218 generates qubit spin values 232 for the sentiment key terms encoded in the set of qubits. In other words, natural language processor 218 generates a qubit spin value for each sentiment key term encoded in the set of qubits. A qubit spin value may be, for example, a voltage value corresponding to a particular particle spin.

Further, natural language processor 218 maps each spin value in qubit spin values 232 to a particular sentiment key term value in sentiment key term values 230. Natural language processor 218 utilizes this mapping to identify sentiment key terms based on generated spin values. Furthermore, natural language processor 218 utilizes coefficient values 234 to weight the different sentiment key terms. For example, natural language processor 218 may weight the sentiment term "love" with a higher coefficient value and the sentiment term "like" with a lower coefficient value.

Moreover, natural language processor 218 may utilize time-indexed vocabulary 236 to modify a response to user query 220. Time-indexed vocabulary 236 represents a dictionary of slang or period-specific language, which is indexed to a predefined period of time, such as a particular decade (e.g., 1960-1969) or a particular century (1700-1799). In other words, meanings of certain words change over time or that certain words are only used during a certain period of time. Also, it should be noted that time-indexed vocabulary 236 may represent a plurality of different time-indexed vocabularies. In other words, natural language processor 218 utilizes time-indexed vocabulary 236 to modify a response to user query 220 to match the type of slang or period-specific language used in user query 220.

Natural language processor 218 may utilize sentence template 238 to generate the response to user query 220. Sentence template 238 represents a template for generating natural language sentences. Also, it should be noted that sentence template 238 may represent a plurality of different sentence templates, which may be based on different languages, for example. In other words, natural language processor 218 may insert words into sentence template 238 to generate the natural language response, which expresses the appropriate sentiment in the correct time-indexed vocabulary.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments take into account and provide a solution to the problems associated with traditional social sentiment identification and natural language generation on a classical computer. For example, a computer utilizing an illustrative embodiment of the present invention and the quantum properties of superposition and entanglement is able to reduce the number of computations required for social sentiment identification and natural language generation and, therefore, increase the performance of the computer, itself, by decreasing computer resource utilization. Quantum superposition enables illustrative embodiments to identify social sentiment in natural language text within one operation. For example, quantum superposition states that the net sentiment response at a given place and time caused by two or more sentiment stimuli is the sum of sentiment responses that would have been caused by each sentiment stimulus. Quantum entanglement provides illustrative embodiments an ability to generate natural language text based on words that produce a social sentiment that is entangled with a sentiment expressed in an independent natural language passage of text, such as a sentence, paragraph, or article. For example, quantum entanglement occurs when independent particles, which correspond to particular sentiment key terms, are separated by a distance, but are correlated as sentiment key terms.

Illustrative embodiments utilize qubits to encode sentiment data into a $2^n$ space of a quantum computer, instead of a binary n space of a classical computer. As a result, illustrative embodiments are capable of identifying the social sentiment expressed within a natural language passage of text in one step or operation. Entanglement then can cause changes to other particles at a distance, which map to sentiment key terms. These changes at a distance determine which sentiment key terms illustrative embodiments will generate for a response based on the sentiment key terms extracted from the original natural language passage of text.

For example, illustrative embodiments encode sentiment key terms or keywords, such as, for example, love, play, like, and hate into social sentiment qubits. Similarly, illustrative embodiments may encode equivalent sentiment key terms in other languages having a similar linguistic typology (e.g., subject-verb-object (SVO), verb-subject-object (VSO), verb-object-subject (VOS), and the like) into equivalent social sentiment qubits. As a result, illustrative embodiments are capable of converting a sentiment expressed in one language to a same or opposite sentiment in a different language, which has a similar linguistic typology as the original language. Linguistic typology is a field of linguistics that studies and classifies languages according to their structural and functional features. In linguistic typology, SVO is a sentence structure where the subject comes first, the verb second, and the object third. English is an example of an SVO linguistic typology.

The encoded social sentiment qubits can be in a position of spin up, spin down, or a combination of spin up and spin down at the same time. As a result, the social sentiment is on a real-time value scale. Illustrative embodiments may correlate social sentiment qubits together using coefficients. Illustrative embodiments sum all of the sentiment values corresponding to each sentiment key term extracted from the original natural language passage of text to generate a total sentiment value that illustrative embodiments can observe. Illustrative embodiments also sum unobservable superpositioned states together using the coefficient values. When illustrative embodiments observe the final sentiment state, then illustrative embodiments provide the spin up or spin down corresponding to the final sentiment state, which loses the combined state. By taking repeated observations, illustrative embodiments may determine a probabilistic view or confidence value for an appropriate sentiment response to the original natural language passage of text. After illustrative embodiments determine the confidence value, then illustrative embodiments may fine-tune the sentiment response by sentiment-based entanglement using a time-indexed vocabulary.

Further, illustrative embodiments utilize the parallel computing of quantum computing, which has a large encoding space that can take $2^n$ states. Illustrative embodiments take the entangled state between particles corresponding to the base sentiment expressed in the original natural language passage of text and influence the coefficient values of a generated sequence of sentiment words. As a result, illustrative embodiments may automatically generate natural language words that will produce a congruent (i.e., same) social sentiment or a contrasting (i.e., opposite) social sentiment as that of the original base sentiment.

Figure 3:
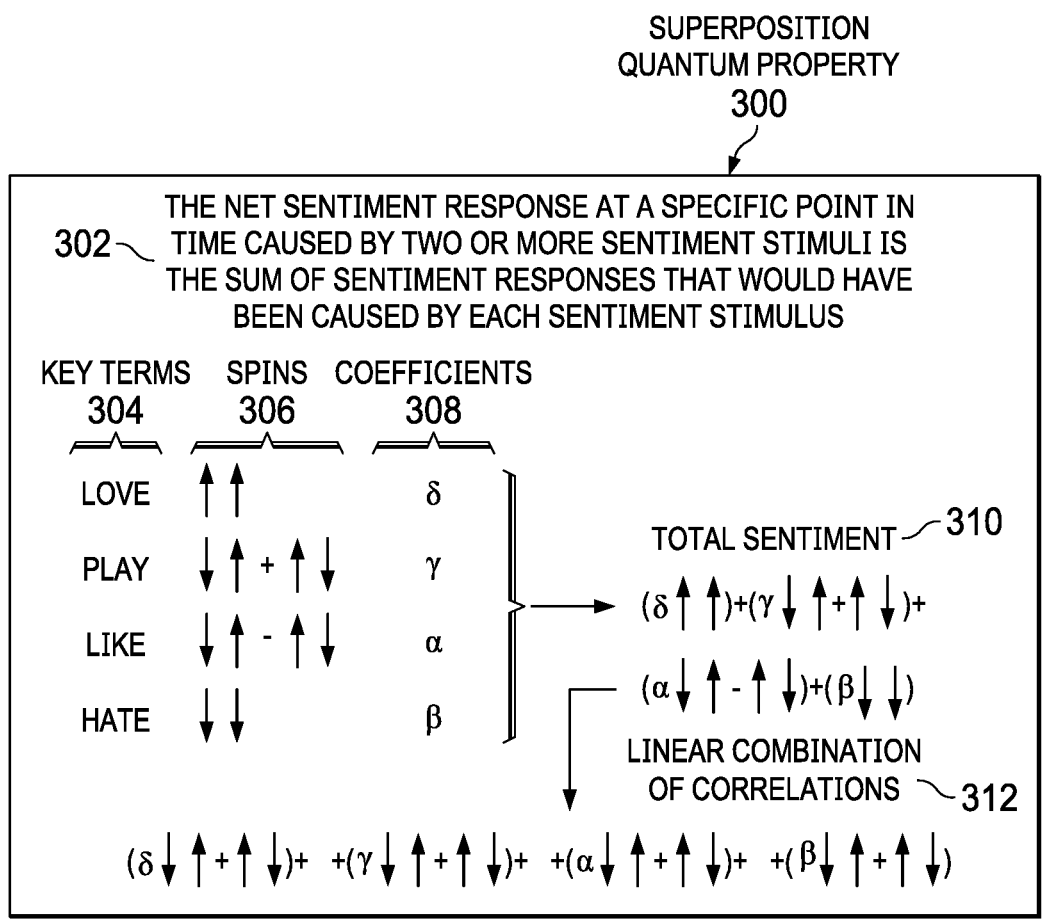
FIG. 3 is a diagram illustrating an example of the quantum property of superposition in accordance with an illustrative embodiment.

With reference now to FIG. 3, a diagram illustrating an example of the quantum property of superposition is depicted in accordance with an illustrative embodiment. Superposition quantum property 300 may be implemented in a quantum computer, such as server 104 in FIG. 1 or data processing system 200 in FIG. 2. Superposition quantum property 300 states at 302 that the net sentiment response at a specific point in time, which is caused by two or more sentiment stimuli, is the sum of sentiment responses caused by each individual sentiment stimulus.

Key terms 304 represent a set of extracted sentiment key terms that correspond to an ingested natural language passage of text. Spins 306 represent predefined particle spins that correspond to each of the particular sentiment key terms in key terms 304. Illustrative embodiments encode key terms 304 into qubits as spins 306. Coefficients 308 represent predefined values that weight each of the values corresponding to key terms 304. It should be noted that sentiment key term values are determined at a specific point in time prior to encoding into the qubits. Illustrative embodiments may utilize coefficients 308 to translate voltages of spins 306 into sentiment key term values. Total sentiment 310 represents a summation of all sentiment key term values corresponding to key terms 304. Linear combination of correlations 312 represent a combination of sentiment key terms correlations that correspond to total sentiment 310.

Figure 4:
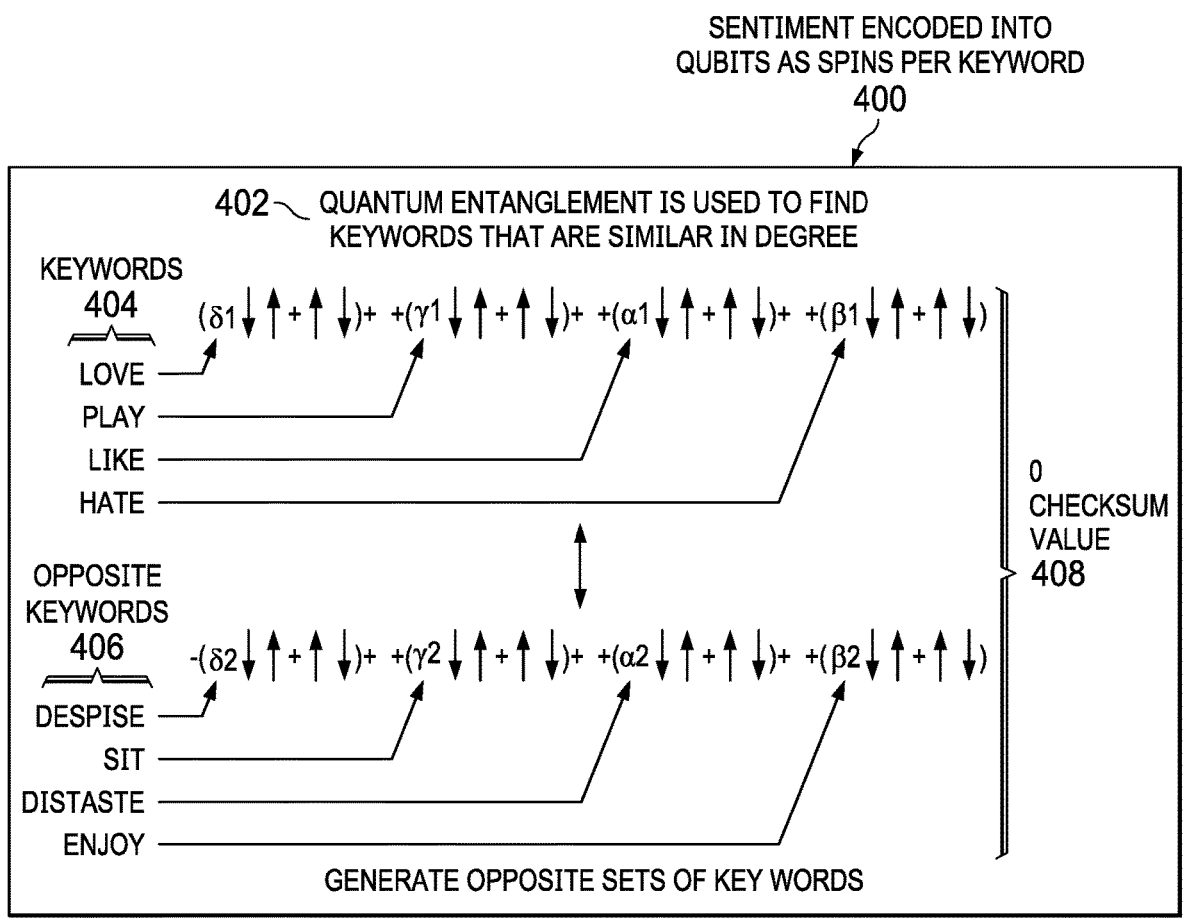
FIG. 4 is a diagram illustrating an example of encoding sentiment into qubits as particle spins per sentiment keyword in accordance with an illustrative embodiment.

With reference now to FIG. 4, a diagram illustrating an example of encoding sentiment into qubits as particle spins per sentiment keyword is depicted in accordance with an illustrative embodiment. Sentiment encoded into qubits as spins per keyword 400 may be implemented in a quantum computer, such as server 104 in FIG. 1 or data processing system 200 in FIG. 2. Sentiment encoded into qubits as spins per keyword 400 represents a plurality of sentiment key terms, which are extracted from an ingested natural language passage of text, that are encoded per sentiment key term into social sentiment qubits as particle spins.

At 402, illustrative embodiments use quantum entanglement to find keywords that are similar in degree. In this example, the sentiment key terms extracted from the ingested natural language passage of text are keywords 404, which include the words love, play, like, and hate. Also in this example, illustrative embodiments generate opposite keywords 406, which include the words despise, sit, distaste, and enjoy. Opposite keywords 406 represent a set of sentiment key terms that express a sentiment directly opposite of keywords 404.

To ensure that opposite keywords 406 express a sentiment opposite of keywords 404, illustrative embodiments perform a checksum operation and generate checksum value 408. In this example, checksum value 408 is equal to zero, which indicates that keywords 404 and opposite keywords 406 express opposing sentiments. For example, if the sentiment key term values of keywords 404 are equal to a positive 40 and the sentiment key term values of opposite keywords 406 are equal to a negative 40, then the result of adding positive 40 and negative 40 is zero. However, it should be noted that illustrative embodiments may utilize an acceptable tolerance range, such as, for example, plus or minus 5 percent, for checksum value 408 to determine whether illustrative embodiments generated the correct sentiment for a response to the ingested natural language passage of text.

Also, it should be noted that illustrative embodiments may generate a set of sentiment key terms that express the same or similar sentiment as keywords 404. In this case, checksum value 408 will be equal to 2×. In other words, if the sentiment key term values of keywords 404 are equal to 40 and the sentiment key term values of the set of sentiment key terms expressing the same sentiment are equal to 40, then the result of adding both values is 80.

Figure 5A:
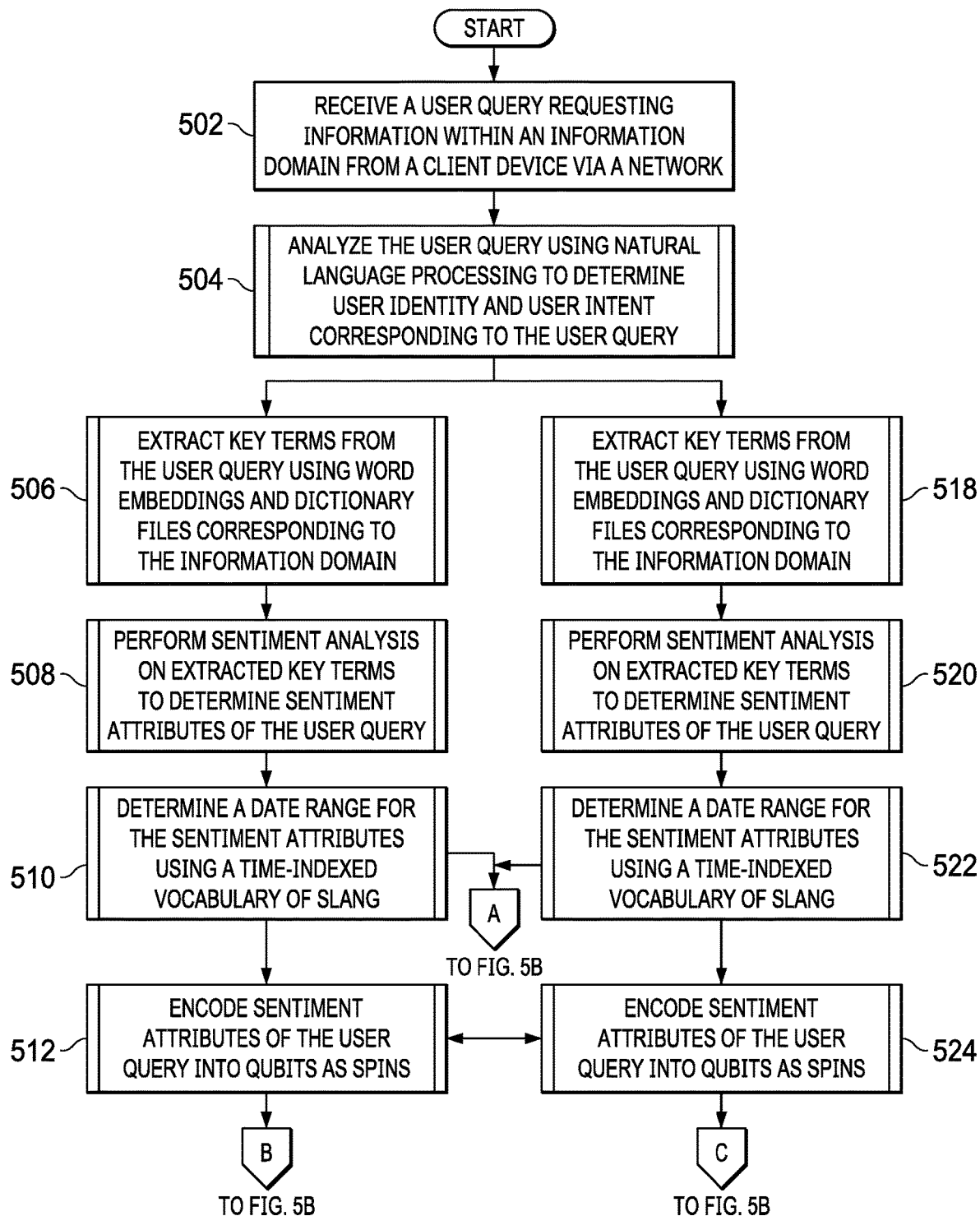
FIGS. 5A-5B are a flowchart illustrating a process for generating a natural language text response to a user query in accordance with an illustrative embodiment.
Figure 5B:
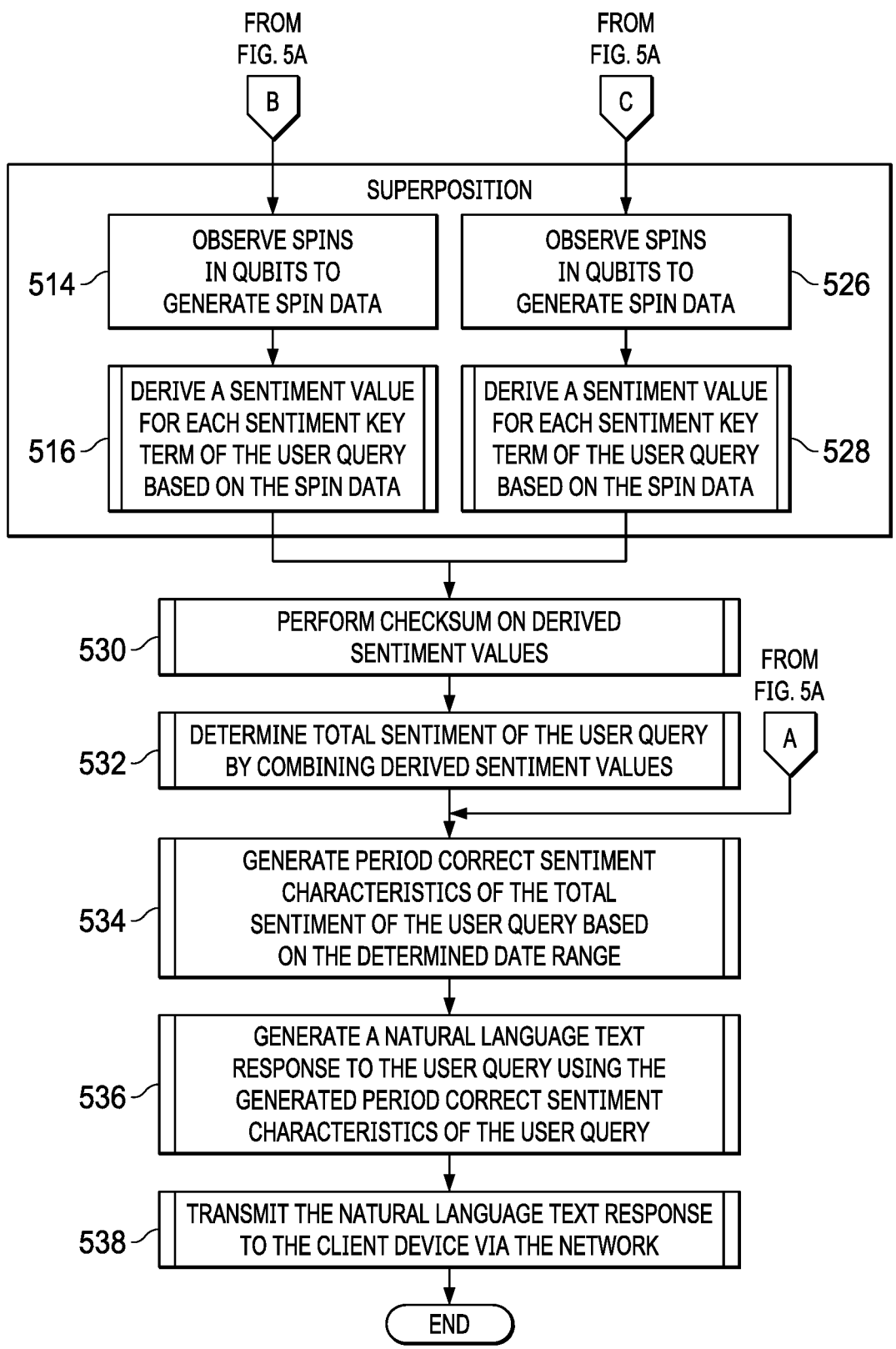

With reference now to FIGS. 5A-5B, a flowchart illustrating a process for generating a natural language text response to a user query is shown in accordance with an illustrative embodiment. The process shown in FIGS. 5A-5B may be implemented in a quantum computer, such as, for example, server 104 in FIG. 1 or data processing system 200 in FIG. 2.

The process begins when the quantum computer receives a user query requesting information within an information domain from a client device via a network (step 502). The quantum computer analyzes the user query using natural language processing to determine user identity and user intent corresponding to the user query (step 504). Further, the quantum computer extracts key terms (e.g., keywords or phrases) from the user query using word embeddings and dictionary files corresponding to the information domain (step 506).

The quantum computer performs sentiment analysis on extracted key terms to determine sentiment attributes of the user query (step 508). In addition, the quantum computer determines a date range for the sentiment attributes using a time-indexed vocabulary of slang (step 510). The time-indexed vocabulary of slang is a dictionary of period-specific slang language referenced by defined periods of time, such as by decades and/or centuries. For example, the time-indexed vocabulary of slang may include the term "groovy", which was primarily used in the 1960's, and meant excellent, awesome, or cool. In other words, if the user query contains the slang term groovy, then the quantum computer may determine that the date range for the sentiment attributes are 1960-1969. Afterward, the quantum computer encodes sentiment attributes of user query into qubits as particle spins (step 512).

Moreover, the quantum computer observes the particle spins in the encoded sentiment qubits to generate spin data (step 514). The spin data may be, for example, spin voltages. Furthermore, the quantum computer derives a sentiment value for each sentiment key term of the user query based on the generated spin data (step 516). For example, the quantum computer may map spin voltages to sentiment values, the sentiment values corresponding to particular sentiment words. The quantum computer also may assign a weight to each particular sentiment word using different coefficient values.

It should be noted that steps 518, 520, 522, 524, 526, and 528 are essentially the same as steps 506, 508, 510, 512, 514, and 516, respectively. In addition, it should be noted that the quantum computer executes steps 518-528 concurrently with steps 506-516. Further, it should be noted that the quantum computer may execute any number of these steps in parallel. Also, it should be noted that an interaction occurs between steps 512 and 524 during encoding of the sentiment qubits.

After executing steps 506-516 and 518-528, the quantum computer performs a checksum on the derived sentiment values (step 530). For example, the quantum computer generates a checksum value corresponding to the derived sentiment values. If the quantum computer generates a set of sentiment key terms that are exactly opposite of the sentiment key terms expressed in the original user query, then the quantum computer should generate a checksum value equal to zero. Alternatively, if the quantum computer generates a set of sentiment key terms that express the same sentiment as the original user query, then the quantum computer should generate a checksum value that is two times the sentiment values of the original user query.

In addition, the quantum computer determines a total sentiment of the user query by combining the derived sentiment values corresponding to each sentiment key term of the user query (step 532). By determining the overall sentiment expressed by the user query, the quantum computer is able to respond in a tone that will convey an appropriate sentiment to that of the overall sentiment expressed in the user query. The quantum computer also generates period correct sentiment characteristics of the total sentiment of the user query based on the date range determined at steps 510 and 522 (step 534). Period correct sentiment is sentiment expressed in slang language that is appropriate for a defined period of time, such as the 1960's. In other words, the quantum computer is capable of generating date-sensitive sentiment according to a specific period of time. For example, the quantum computer may generate sentiment expressed in 1960's slang, which corresponds to the way sentiment was expressed in the user query. Further, the quantum computer generates a natural language text response to the user query using the generated period correct sentiment characteristics of the user query (step 536). Then, the quantum computer transmits the natural language text response to the client device via the network (step 538). Thereafter, the process terminates.

Figure 6:
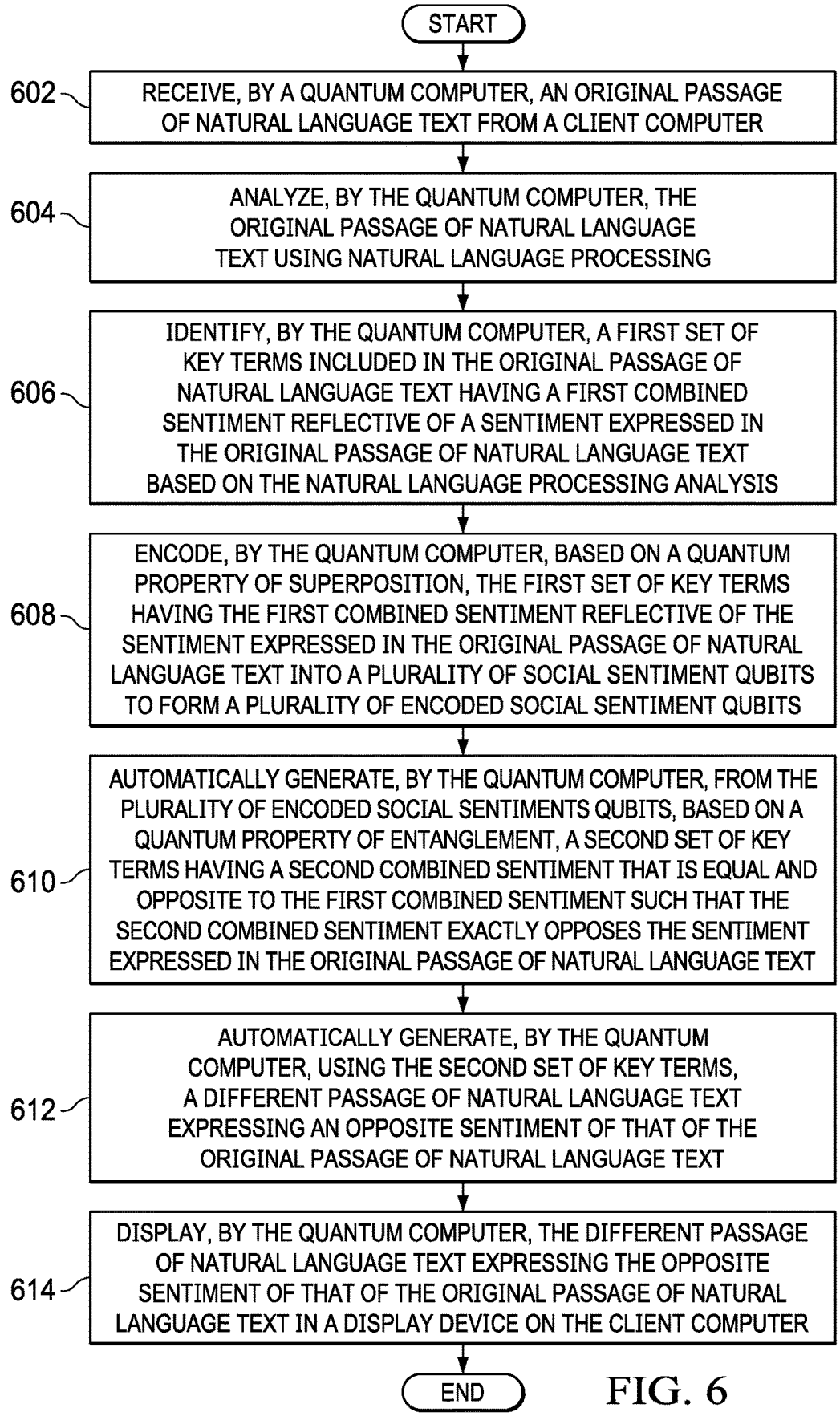
FIG. 6 is a flowchart illustrating a process for generating a natural language passage of text that expresses a sentiment exactly opposite of that of an original natural language passage of text in accordance with an illustrative embodiment.

With reference now to FIG. 6, a flowchart illustrating a process for generating a natural language passage of text that expresses a sentiment exactly opposite of that of an original natural language passage of text is shown in accordance with an illustrative embodiment. The process shown in FIG. 6 may be implemented in a quantum computer, such as, for example, server 104 in FIG. 1 or data processing system 200 in FIG. 2.

The process begins when the quantum computer receives an original passage of natural language text from a client computer (step 602). The natural language text may be any type of textual passage, such as, for example, a news article, a passage from a book, an email, a text message, a problem ticket, and the like. Also, the natural language text may be in any language.

The quantum computer analyzes the original passage of natural language text using natural language processing (step 604). The quantum computer identifies a first set of key terms included in the original passage of natural language text having a first combined sentiment reflective of a sentiment expressed in the original passage of natural language text based on the natural language processing analysis (step 606). Afterward, the quantum computer, based on the quantum property of superposition, encodes the first set of key terms having the first combined sentiment reflective of the sentiment expressed in the original passage of natural language text into a plurality of social sentiment qubits to form a plurality of encoded social sentiment qubits (step 608).

Then, the quantum computer, from the plurality of encoded social sentiment qubits, based on the quantum property of entanglement, automatically generates a second set of key terms having a second combined sentiment that is equal and opposite to the first combined sentiment such that the second combined sentiment exactly opposes the sentiment expressed in the original passage of natural language text (step 610). The quantum computer, using the second set of key terms, automatically generates a different passage of natural language text expressing an opposite sentiment of that of the original passage of natural language text (step 612). The quantum computer then displays the different passage of natural language text expressing the opposite sentiment of that of the original passage of natural language text in a display device of the client computer (step 614). Thereafter, the process terminates.

Thus, illustrative embodiments of the present invention provide a computer-implemented method, computer system, and computer program product for natural language processing of social sentiment using quantum computing to generate encoded sentiment qubits corresponding to sentiment key terms extracted from an ingested natural language passage of text and then to generate a natural language response in a tone appropriate for the sentiment expressed in the ingested natural language passage of text based on the encoded sentiment qubits. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A quantum computer-implemented method for generating a natural language text response to a user query, the computer-implemented method comprising:

encoding, by a computer, a number of sentiment attributes of the user query in parallel into qubits in a $2^n$ space as particle spins, wherein n is the number of qubits, and wherein each qubit can represent a superposition of multiple states;

observing, by the computer, the particle spins in encoded sentiment qubits to generate spin values, wherein each spin value is mapped to a particular sentiment key term by a natural language processor;

deriving, by the computer, a sentiment value for each sentiment key term of the user query based on the generated spin values;

determining, by the computer, a total sentiment of the user query by combining derived sentiment values corresponding to each sentiment key term of the user query;

identifying, by the computer, a second set of sentiment key terms that are correlated to sentiment key terms of the user query through quantum entanglement;

generating, by the computer, a natural language text response to the user query based on the determined total sentiment of the user query and the second set of sentiment key terms according to mappings of spin values to the sentiment key terms of the user query, wherein the natural language text response is generating according to a sentence template; and transmitting, by the computer, the natural language text response to a client device via a network.

2. The computer-implemented method of claim 1 wherein the particle spins comprises spin ups and spin downs, and further comprising:

receiving, by the computer, the user query requesting information within an information domain from the client device via the network;

analyzing, by the computer, the user query using natural language processing to determine user identity and user intent corresponding to the user query; and extracting, by the computer, key terms from the user query using word embeddings and dictionary files corresponding to the information domain.

3. The computer-implemented method of claim 2 further comprising:

performing, by the computer, sentiment analysis on extracted key terms to determine sentiment attributes of the user query.

4. The computer-implemented method of claim 3 further comprising:

determining, by the computer, a date range for the sentiment attributes using a time-indexed vocabulary that comprises time period specific language.

5. The computer-implemented method of claim 4 further comprising:

generating, by the computer, period correct sentiment of the user query based on the determined date range.

6. The computer-implemented method of claim 1 further comprising:

performing, by the computer, a checksum on the derived sentiment values corresponding to each sentiment key term of the user query.

7. The computer-implemented method of claim 1, wherein the spin values are spin voltages, wherein each spin voltage maps to a particular sentiment key term value, and wherein the particular sentiment key term value identifies a particular sentiment key term.

8. A quantum computer system for generating a natural language text response to a user query, the computer system comprising:

a bus system;

a storage device connected to the bus system, wherein the storage device stores program instructions; and a processor connected to the bus system, wherein the processor executes the program instructions to:
  encode a number of sentiment attributes of the user query in parallel into qubits in a $2^n$ space as particle spins, wherein n is the number of qubits, and wherein each qubit can represent a superposition of multiple states;
  observe the particle spins in encoded sentiment qubits to generate spin values, wherein each spin value is mapped to a particular sentiment key term by a natural language processor;
  derive a sentiment value for each sentiment key term of the user query based on the generated spin values;
  determine a total sentiment of the user query by combining derived sentiment values corresponding to each sentiment key term of the user query;
  identify a second set of sentiment key terms that are correlated to sentiment key terms of the user query through quantum entanglement;
  generate a natural language text response to the user query based on the determined total sentiment of the user query and the second set of sentiment key terms according to mappings of spin values to the sentiment key terms of the user, wherein the natural language text response is generating according to a sentence template; and
  transmit the natural language text response to a client device via a network.

9. The computer system of claim 8, wherein the particle spins comprises spin ups and spin downs, and wherein the processor further executes the program instructions to:
  receive the user query requesting information within an information domain from the client device via the network;
  analyze the user query using natural language processing to determine user identity and user intent corresponding to the user query; and
  extract key terms from the user query using word embeddings and dictionary files corresponding to the information domain.

10. The computer system of claim 9, wherein the processor further executes the program instructions to:
  perform sentiment analysis on extracted key terms to determine sentiment attributes of the user query.

11. The computer system of claim 10, wherein the processor further executes the program instructions to:
  determine a date range for the sentiment attributes using a time-indexed vocabulary that comprises time period specific language.

12. The computer system of claim 11, wherein the processor further executes the program instructions to:
  generate period correct sentiment of the user query based on the determined date range.

13. The computer system of claim 8, wherein the processor further executes the program instructions to:
  perform a checksum on the derived sentiment values corresponding to each sentiment key term of the user query.

14. The computer system of claim 8, wherein the spin values are spin voltages, wherein each spin voltage maps to a particular sentiment key term value, and wherein the particular sentiment key term value identifies a particular sentiment key term.

15. A computer program product for generating a natural language text response to a user query, the computer program product comprising a computer readable storage medium having program instructions embodied therewith, the program instructions executable by a quantum computer to cause the computer to perform a method comprising:
  encoding, by the computer, a number of sentiment attributes of the user query in parallel into qubits in a $2^n$ space as particle spins, wherein n is the number of qubits, and wherein each qubit can represent a superposition of multiple states;
  observing, by the computer, the particle spins in encoded sentiment qubits to generate spin values, wherein each spin value is mapped to a particular sentiment key term by a natural language processor;
  deriving, by the computer, a sentiment value for each sentiment key term of the user query based on the generated spin values;
  determining, by the computer, a total sentiment of the user query by combining derived sentiment values corresponding to each sentiment key term of the user query;
  identifying, by the computer, a second set of sentiment key terms that are correlated to sentiment key terms of the user query through quantum entanglement;
  generating, by the computer, a natural language text response to the user query based on the determined total sentiment of the user query and the second set of sentiment key terms according to mappings of spin values to the sentiment key terms of the user, wherein the natural language text response is generating according to a sentence template; and
  transmitting, by the computer, the natural language text response to a client device via a network.

16. The computer program product of claim 15 wherein the particle spins comprises spin ups and spin downs, and further comprising:
  receiving, by the computer, the user query requesting information within an information domain from the client device via the network;
  analyzing, by the computer, the user query using natural language processing to determine user identity and user intent corresponding to the user query; and
  extracting, by the computer, key terms from the user query using word embeddings and dictionary files corresponding to the information domain.

17. The computer program product of claim 16 further comprising:
  performing, by the computer, sentiment analysis on extracted key terms to determine sentiment attributes of the user query.

18. The computer program product of claim 17 further comprising:
  determining, by the computer, a date range for the sentiment attributes using a time-indexed vocabulary that comprises time period specific language.

19. The computer program product of claim 18 further comprising:
  generating, by the computer, period correct sentiment of the user query based on the determined date range.

20. The computer program product of claim 15 further comprising:
  performing, by the computer, a checksum on the derived sentiment values corresponding to each sentiment key term of the user query.

21. The computer program product of claim 15, wherein the spin values are spin voltages, wherein each spin voltage maps to a particular sentiment key term value, and wherein the particular sentiment key term value identifies a particular sentiment key term.

* * * * *